B. W. DAVID.
LUBRICATING DEVICE FOR VERTICAL SPINDLE BEARINGS.
APPLICATION FILED DEC. 29, 1919.

1,372,801.

Patented Mar. 29, 1921.

Inventor
Bruce W. David
By Ray, Oberlin & Ray
Attorneys

UNITED STATES PATENT OFFICE.

BRUCE W. DAVID, OF CLEVELAND HEIGHTS, OHIO, ASSIGNOR TO THE LINCOLN ELECTRIC COMPANY, OF CLEVELAND, OHIO, A CORPORATION OF OHIO.

LUBRICATING DEVICE FOR VERTICAL-SPINDLE BEARINGS.

1,372,801.     Specification of Letters Patent.     Patented Mar. 29, 1921.

Application filed December 29, 1919. Serial No. 347,927.

*To all whom it may concern:*

Be it known that I, BRUCE W. DAVID, a citizen of the United States, and a resident of Cleveland Heights, county of Cuyahoga, and State of Ohio, have invented a new and useful Improvement in Lubricating Devices for Vertical-Spindle Bearings, of which the following is a specification, the principle of the invention being herein explained and the best mode in which I have contemplated applying that principle, so as to distinguish it from other inventions.

The object of the present invention is to provide an automatically operating device, whereby oil or other equivalent lubricant may be raised from a suitable receptacle surrounding the shaft to the bearing surfaces thereabove, specifically to a ball bearing.

To the accomplishment of the foregoing and related objects, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1:
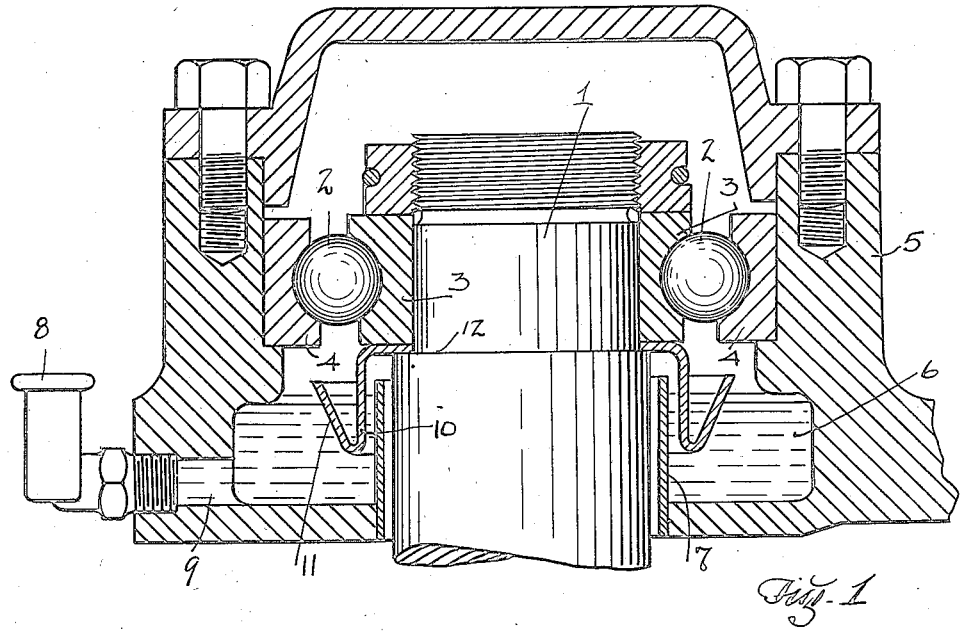
Figure 2:
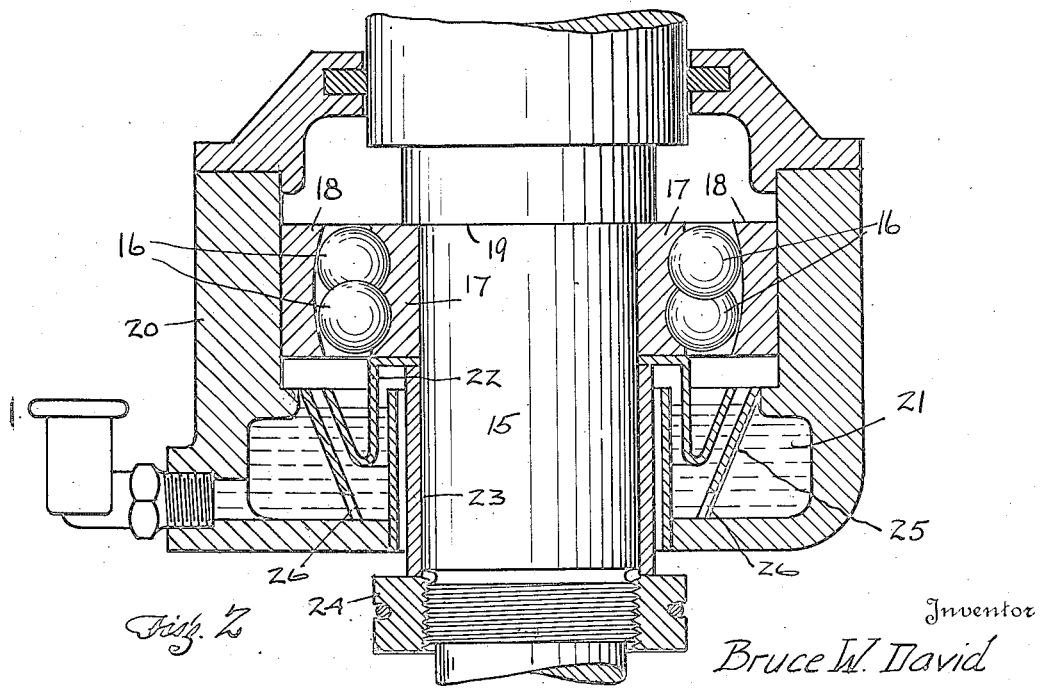

Figure 1 is a central vertical section through a spindle equipped with one form of my improved lubricating device; and Fig. 2 is a similar view illustrating a slightly different form of bearing, and in conjunction therewith a modified form of such lubricating device.

I am aware that it has heretofore been proposed to force oil from a receptacle surrounding a rotating shaft upwardly into a bearing being located over such receptacle, this result to be achieved by setting the oil in such receptacle in rotation, and by the centrifugal action thus developed forcing the same up along the inner surface of the outer wall of the receptacle. By my invention, however, I am enabled to use such centrifugal force directly, in combination with the capillary action of the lubricant or its tendency to adhere to and flow over a smooth surface.

Referring, first of all, to the construction shown in Fig. 1, the upper end of a vertical spindle or shaft 1 is here shown as supported in a ball bearing of familiar construction, consisting of balls 2 and inner and outer raceways 3 and 4. Such outer raceway is suitably mounted in a portion of the framework 5 of the machine whereof such spindle forms an operative part, and cored out of such frame is an annular receptacle 6 which surrounds the spindle 1 immediately below such bearing. The inner wall of this receptacle, as a matter of fact, for convenience of manufacture, is formed of a separate ring 7 welded at its lower edge to the adjacent portion of the frame, but might just as well be integral so far as the present invention is concerned. The annular receptacle thus provided is designed to be supplied with lubricant from an oil cup 8 through a connecting passage 9 in the frame.

Fixedly secured to the spindle 1, so as to rotate therewith, is an inverted cup-shaped member 10, said member depending into said receptacle and having its annular wall 11 recurved to flare upwardly and outwardly. This member is conveniently secured to the spindle by being clamped between a shoulder 12 thereon and the inner raceway 3. As a result of the construction just described, assuming the receptacle to be filled with oil to the level indicated in the figure, upon rotation of the spindle the oil adhering to this recurved flaring portion of the wall of member 10 will obviously be subjected to centrifugal force in an increasing measure, as the speed of rotation increases. The oil or other lubricant accordingly tends to travel upwardly along such face, and will pile or build up in the space above the member until it reaches the ball bearing which it is desired to lubricate.

In the construction shown in Fig. 2, as previously indicated, the ball bearing is of a slightly different type, it being observed that it is the lower end 15 of a vertical shaft that is here shown as being supported in said bearing. The latter here comprises two sets of balls 16 held between inner and outer raceways 17 and 18, the former held against a shoulder 19 on the shaft, and the latter in the framework 20 of the machine as before. An annular receptacle 21, substantially identical with the receptacle 6 previously described, is formed in such frame so as to surround the spindle, and a substantially identical cup-shaped member 22 is employed as before, the latter being held in place against the inner raceway by means of a sleeve 23 pressing thereagainst, such sleeve being in turn secured by means of a locking ring or nut 24 threaded onto the shaft. In addition, however, to the parts thus noted as corresponding to those of the first described construction, I here provide an additional member consisting of an annular partition 25 inserted in the receptacle, said partition being supported with its inner face closely adjacent to and conforming with the recurved wall of the cup-shaped member 22 so as to leave only a relatively constricted annular passage between the two. The partition is provided with a plurality of apertures 26 whereby free communication is had between the two sides of said partition.

The effect of the introduction of a partition of the character just described, I have found is to increase what I have referred to as the capillary action, and thereby correspondingly to augment the centrifugal effect secured by the rotation of the cup-shaped member. In other words, with this partition the flow of the oil may be secured at lower spindle speeds than where no such partition is present; also the rate of flow of the oil will be more accurately graduated to correspond with the spindle speed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a lubricating device for a bearing on a vertically disposed spindle the combination of an oil receptacle surrounding the spindle, an annular member attached to said spindle so as to rotate therewith, said member depending into said receptacle and the outer face thereof flaring upwardly and outwardly, and a partition in said receptacle adjacent to and conforming with such outer face of said member, there being free communication between the two sides of said partition.

2. In a lubricating device for a bearing on a vertically disposed spindle, the combination of an oil receptacle surrounding the spindle, a cup-shaped member attached to said spindle so as to rotate therewith, said member depending into said receptacle and having its annular wall recurved to flare upwardly and outwardly, and a partition in said receptacle adjacent to and conforming with such recurved wall of said member, there being free communication between the two sides of said partition.

3. In a lubricating device for a bearing on a vertically disposed spindle, the combination of an oil receptacle surrounding the spindle, an annular member attached to said spindle so as to rotate therewith, said member depending into said receptacle, and a partition in said receptacle adjacent to and conforming with the outer face of said member, there being free communication between the two sides of said partition.

Signed by me, this 26th day of December, 1919.

BRUCE W. DAVID.